(12) United States Patent
Kurumizawa et al.

(10) Patent No.: US 8,616,909 B2
(45) Date of Patent: Dec. 31, 2013

(54) LOCK DEVICE

(71) Applicant: Kabushiki Kaisha Tokai Rika Denki Seisakusho, Aichi (JP)

(72) Inventors: Naoto Kurumizawa, Aichi (JP); Keiji Kahara, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/799,107

(22) Filed: Mar. 13, 2013

(65) Prior Publication Data

US 2013/0255334 A1    Oct. 3, 2013

(30) Foreign Application Priority Data

Mar. 29, 2012    (JP) .................................. 2012-077051

(51) Int. Cl.
*H01R 13/62* (2006.01)
(52) U.S. Cl.
USPC .......................................... 439/304; 320/109

(58) Field of Classification Search
USPC ........................... 439/304, 352, 133; 320/109
See application file for complete search history.

(56) References Cited

U.S. PATENT DOCUMENTS

| | | | | |
|---|---|---|---|---|
| 6,203,355 B1 * | 3/2001 | Neblett et al. | ................. | 439/372 |
| 8,075,329 B1 * | 12/2011 | Janarthanam et al. | ......... | 439/304 |
| 8,206,172 B2 * | 6/2012 | Katagiri et al. | ............... | 439/352 |
| 8,357,001 B2 * | 1/2013 | Katagiri et al. | ............... | 439/304 |
| 8,357,002 B2 * | 1/2013 | Katagiri et al. | ............... | 439/304 |
| 2012/0007554 A1 * | 1/2012 | Kanamori et al. | ............ | 320/109 |
| 2012/0319648 A1 * | 12/2012 | Ohtomo | ....................... | 320/109 |

FOREIGN PATENT DOCUMENTS

JP    2011-243500    12/2011

* cited by examiner

*Primary Examiner* — Phuong Dinh
(74) *Attorney, Agent, or Firm* — Greenblum & Bernstein P.L.C.

(57) ABSTRACT

A lock device includes a helical gear driven and rotated by a motor. The helical gear is connected to a hook stopper control member, which is moved to a projected position when the helical gear is rotated in a clockwise direction, and a lid latch, which is moved to a retracted position when the helical gear rotated in a clockwise direction. A coil spring constantly urges the lid latch to a projected position.

12 Claims, 11 Drawing Sheets

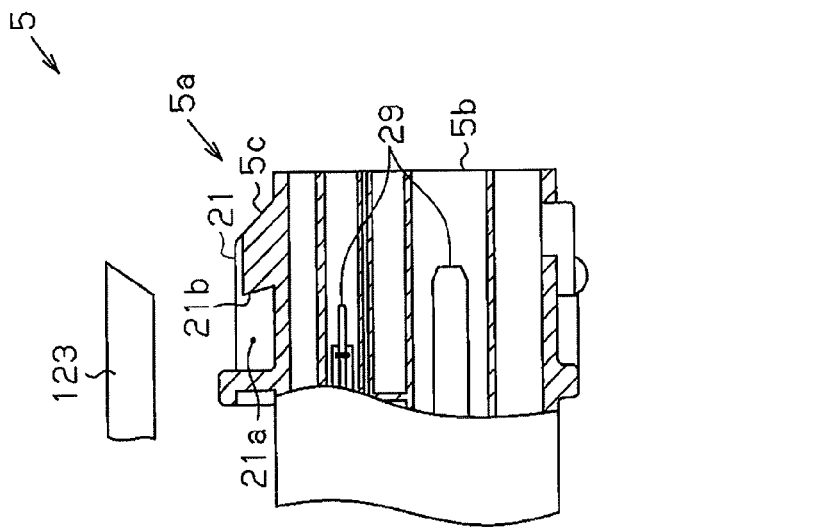
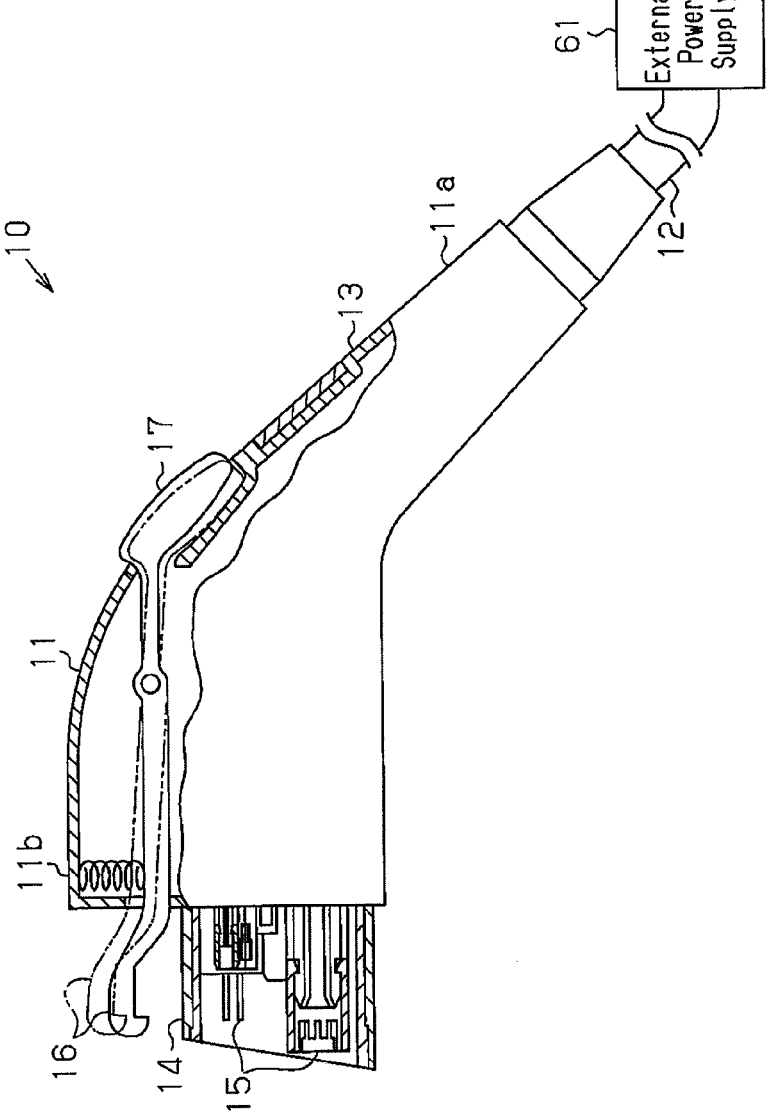

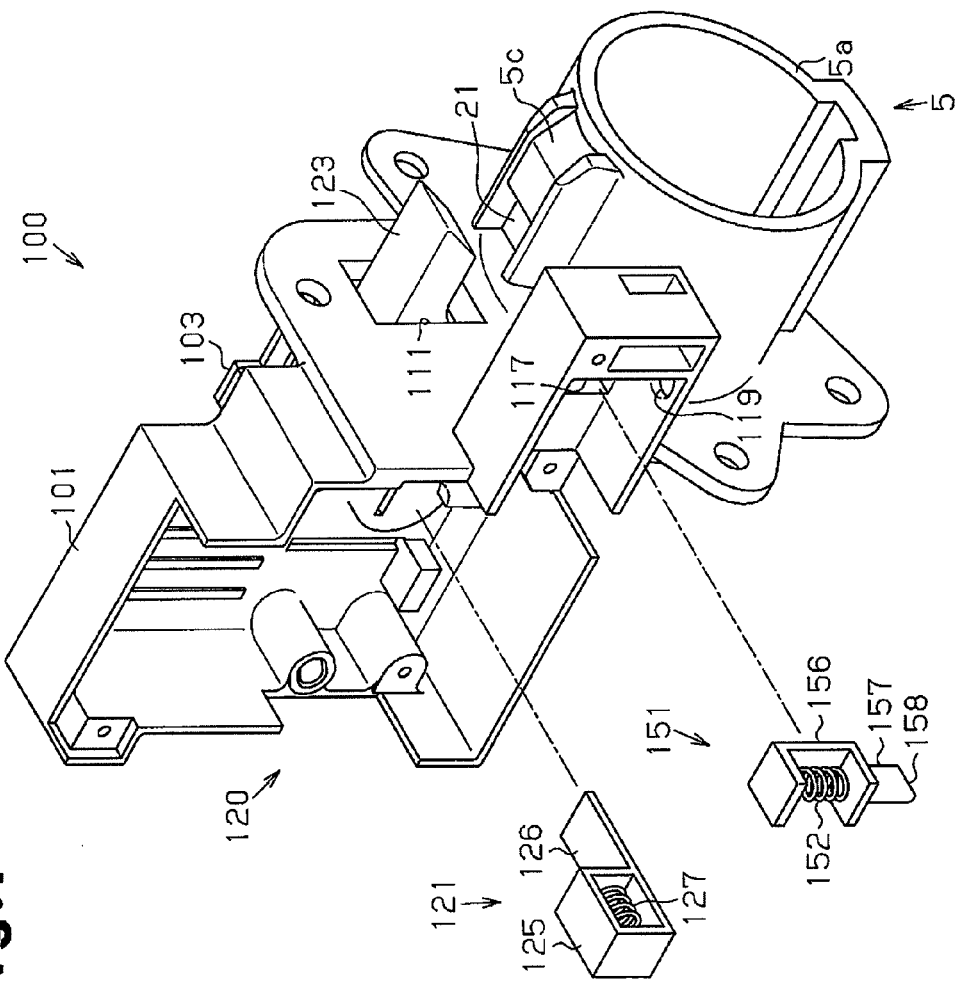
Fig.7
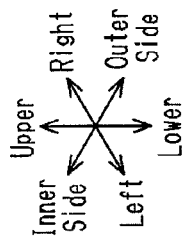

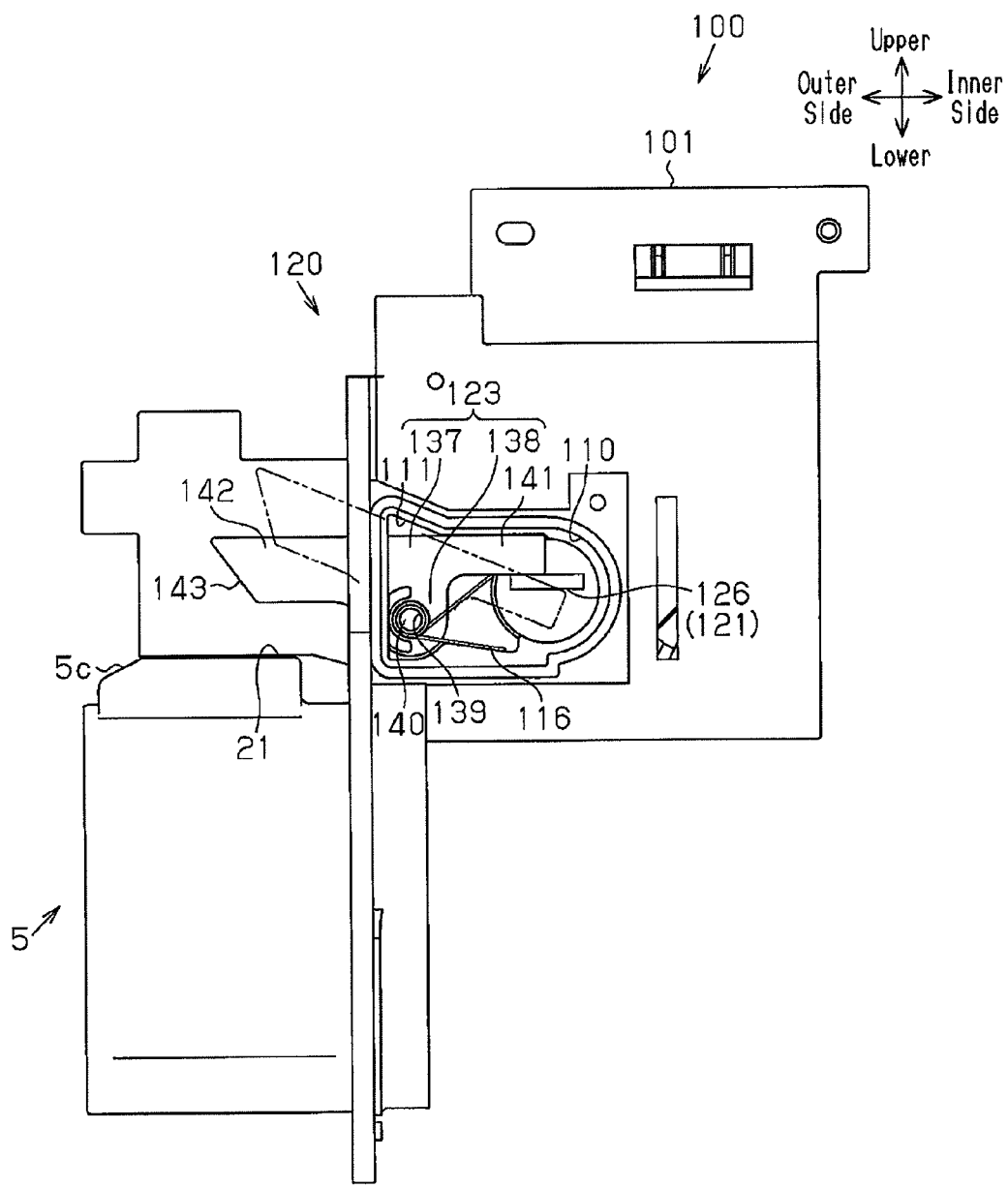

LOCK DEVICE

CROSS-REFERENCE TO RELATED APPLICATIONS

This application is based upon and claims the benefit of priority from prior Japanese Patent Application No. 2012-077051, filed on Mar. 29, 2012, the entire contents of which are incorporated herein by reference.

BACKGROUND ART

The present invention relates to a lock device that restricts removal of a power supplying plug from a power reception connector.

Japanese Laid-Open Patent Publication No. 2011-243500 describes one example of a lock device. The lock device restricts removal of a power supplying plug from a power reception connector (inlet), which is accommodated in an inlet accommodation portion of a vehicle. In addition, the lock device restricts movement of a lid, which closes the inlet accommodation portion, and functions to prevent the power reception connector from being accessed.

The lock device includes a hook lock bar and a lid lock bar. The hook lock bar moves between a hook lock position and a hook unlock position. The lid lock bar moves between a lid lock position and a lid unlock position. When the hook lock bar is located at the hook unlock position, the hook lock bar restricts movement of a hook of the power supplying plug, which is connected to the inlet and engaged with a hook seat of the inlet. When the hook lock bar is located at the hook unlock position, the hook is unlocked and is able to be disengaged from the hook seat. This permits movement of the hook.

When the lid lock bar is located at the lid lock position, the lid lock bar is received in a lid hole of the lid thereby restricting opening of the lid. When the lid lock bar is located at the lid unlock position, the lid lock bar is separated from the lid hole thereby permitting opening of the lid.

The hook lock bar and the lid lock bar are moved in cooperation with the rotation of rotating bodies driven by the same motor. Accordingly, when the motor rotates the rotating bodies, the hook lock bar moves between the hook lock position and the hook unlock position. Simultaneously, the lid lock bar is moved between the lid lock position and the lid unlock position.

When the power supplying plug is connected to the inlet and the hook lock bar is located at the hook lock position, the hook is held on the hook seat. This restricts removal of the power supplying plug from the inlet. When the inlet accommodation portion is closed by the lid and the lid lock bar is located at the lid lock position, the lid lock bar is held in the lid hole. This restricts opening of the lid.

To open the lid, the lock device always drives the motor to move the lock bar to the lid unlock position. When the inlet accommodation portion is closed by the lid, the lock device also drives the motor to move the lid lock bar from the lid unlock position to the lid lock position. In both cases, it takes time for the motor to drive and complete the movement of the lid lock bar. Thus, the lock device is inconvenient.

SUMMARY

It is an object of the present invention to provide a lock device that locks a power supplying plug and a lid with the same drive source and is easy to use.

One aspect of the present invention is a lock device that locks a lid and a power supplying plug. The lid protects a power reception connector. The lock device includes a plug restriction member that moves between a plug lock position and a plug unlock position. The plug restriction member restricts removal of the power supplying plug from the power reception connector at the plug lock position, and the plug restriction member permits removal of the power supplying plug from the power reception connector at the plug unlock position. A lid restriction member moves between a lid lock position and a lid unlock position. The lid restriction member engages the lid and restricts opening of the lid at the lid lock position. The lid restriction member permits opening of the lid at the lid unlock position. The lid restriction member is constantly urged toward the lid lock position. A drive mechanism includes a drive source and a rotating body. The drive source generates drive force and rotates the rotating body in first and second directions. The drive mechanism is connected to the plug restriction member to move the plug restriction member from the plug unlock position to the plug lock position when the rotating body rotates from the reference position in the first direction. The drive mechanism is connected to the lid restriction member to move the lid restriction member from the lid unlock position to the lid lock position against an urging force acting on the lid restriction member when the rotating body is rotated in the second direction. When closing the lid with the lid restriction member held at the lid lock position, the lid restriction member engages the closing lid and moves toward the lid unlock position thereby permitting the lid to close. The lid restriction member is formed to be returned to the lid lock position by the urging force at a timing at which the lid reaches a close position.

One embodiment provides a lock device mounted on a vehicle including a battery, a travel motor powered by the battery, a power reception connector for a power supplying plug that charges the battery, and a lid for closing the power reception connector. The lock device includes a pivotal hook stopper that pushes the hook when the power supplying plug is connected to the power reception connector; a rotating body rotated in a first direction and a second direction by a drive source; first and second cantilevers extending parallel to a rotation axis of the rotating body in opposite directions; a hook stopper control member connected to a distal end of the first cantilever, wherein the hook stopper control member moves between a retracted position and a projected position when the rotating body rotates to mechanically switch the hook stopper between a pivotal state and a fixed state that prohibits pivoting; and a lid latch connected to a distal end of the second cantilever, wherein the lid latch moves between a retracted position and a projected position when the rotating body rotates. The first cantilever is separated by a predetermined angular interval about the rotation axis of the rotating body from the second cantilever so that, when the rotating body is rotated in one direction by a predetermined angle, the first cantilever and the second cantilever move the hook stopper control member and the lid latch in directions that are intersected to each other. The lid latch is urged to automatically return to the projection position when the lid is closed while the driving source is deactivated.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a partial cross-sectional view of a power supplying plug;

FIG. 3 is a cross-sectional view of an inlet and a lock device;

FIGS. 6 and 7 are exploded perspective views of the lock device;

FIG. 8 is a right view of the lock device;

DETAILED DESCRIPTION OF EMBODIMENTS

Figure 6:
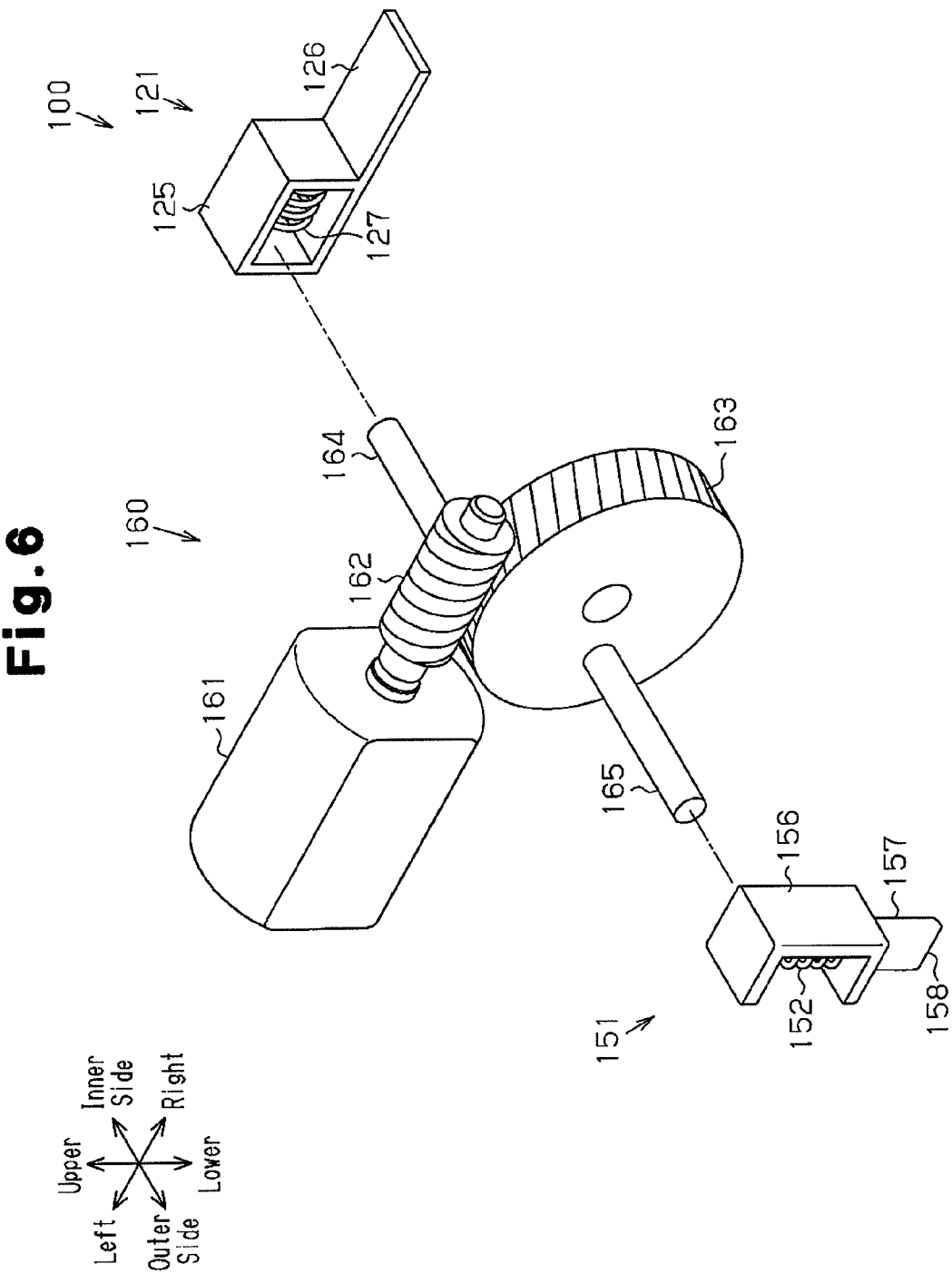

In the description hereafter, to facilitate understanding, directions and positional relationships will be used referring to the coordinate system showing in FIGS. 6 and 7.

Figure 1:
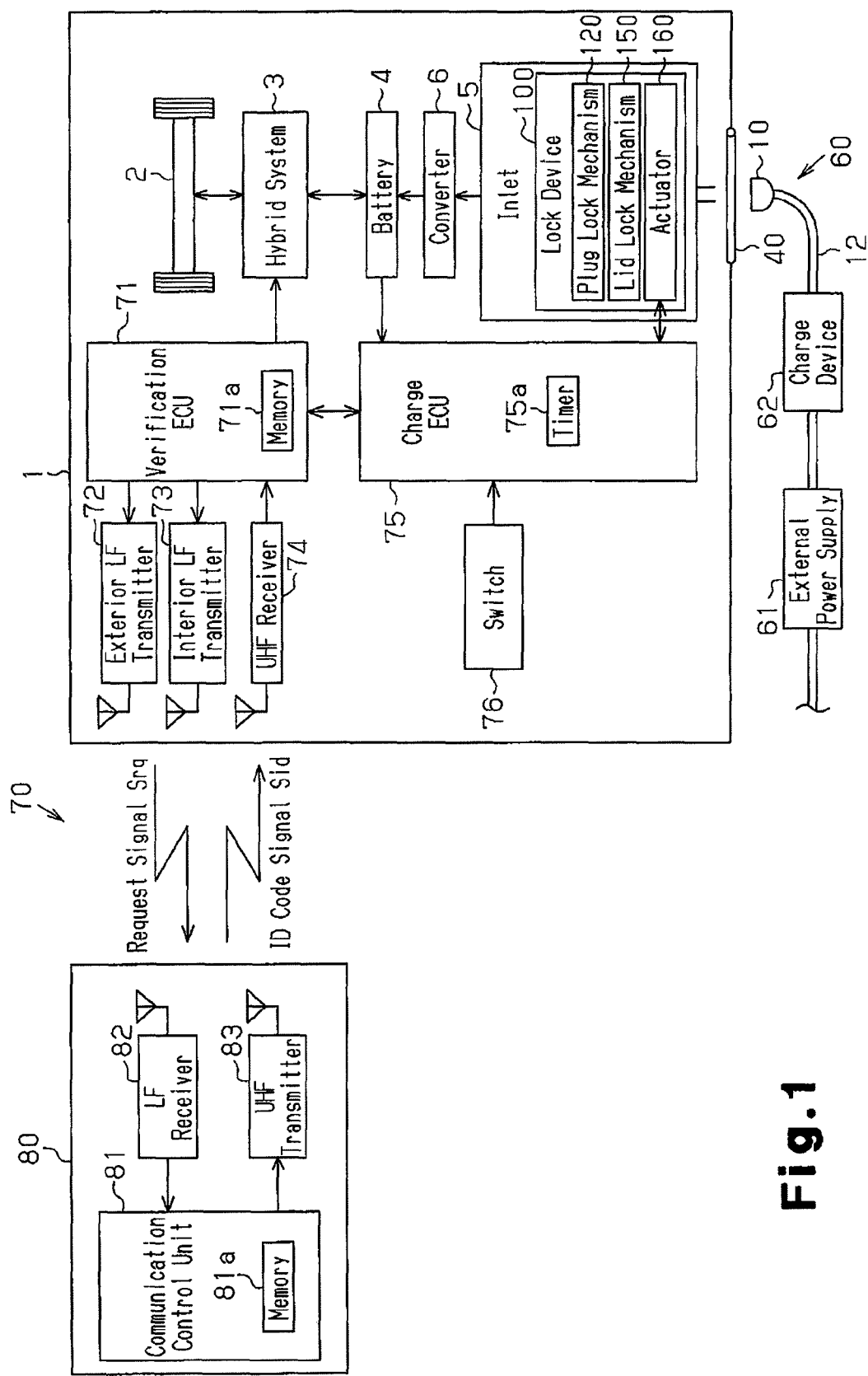
FIG. 1 is a schematic block diagram of a charge system and an electronic key system according to one embodiment of the present invention.

A lock device according to one embodiment of the present invention may be arranged in a vehicle 1, such as a plug-in hybrid vehicle. As shown in FIG. 1, the vehicle includes a hybrid system 3 that combines the drive forces of an engine and a travel motor to rotate drive wheels 2. A battery 4 is connected to the hybrid system 3.

The hybrid system 3 switches traveling modes in accordance with the travel state of the vehicle or the like. The travel modes include a mode for driving the drive wheels 2 with only the power of the engine, a mode for driving the drive wheels 2 with both of the engine and the travel motor, and a mode for driving the drive wheels 2 with only the travel motor. The hybrid system 3 also switches charging modes in accordance with the travel state of the vehicle or the like. The charging modes include a mode for charging the battery 4 with the power of the engine and a mode for charging the battery with the power obtained by converting the braking force of the drive wheels 2 with the travel motor. The vehicle 1 travels and charges the travel motor in accordance with the travel mode and the charge mode switched by the hybrid system.

The battery 4 is connected to an inlet 5 by a converter 6. The inlet 5 functions as a power reception connector that receives a power supplying plug 10, which is connected to an external power supply 61 (AC power supply) by a charge device 62. In the example shown in FIG. 4, the inlet 5 is arranged in an inlet accommodation portion 1a arranged in a side surface of the vehicle 1. The inlet accommodation portion 1a includes an opening 1b that may be closed by a movable lid 40. Referring to FIG. 1, when the power supplying plug 10 is connected to the inlet 5, the charge device 62 transmits a connection signal to the vehicle 1. The converter 6 converts AC voltage, which is supplied from the power supplying plug 10 via the inlet 5, to DC voltage, and supplies the converted DC voltage to the battery 4. In this manner, the battery 4 is charged by the external power supply 61.

The vehicle 1 includes an electronic key system 70 that executes vehicle control allowing, for example, automatic locking and unlocking of vehicle doors without the need for a user to operate a vehicle key. The electronic key system 70 executes the vehicle control through wireless communication performed between the vehicle 1 and an electronic key 80, which serves as an electronic key held by the user.

The electronic key system 70 will now be described. The vehicle 1 includes a verification ECU 71 connected to an exterior low frequency (LF) transmitter 72, an interior LF transmitter 73, and an ultrahigh frequency (UHF) receiver 74. The exterior LF transmitter 72 is arranged in each door of the vehicle 1 and transmits a signal on the LF band. The interior LF transmitter 73 is arranged in the vehicle floor and transmits a wireless signal on the LF band. The UHF receiver 74 is arranged in a rear portion of the vehicle body and transmits a wireless signal on the UHF band. The verification ECU 71 includes a memory 71a, which stores in advance, a unique ID code corresponding to the electronic key 80.

The electronic key 80 includes a communication control unit 81 connected to an LF receiver 82 and a UHF transmitter 83. The LF receiver 82 receives a signal on the LF band. The UHF transmitter 83 transmits a signal on the UHF band in accordance with a command from the communication control unit 81. The communication control unit 81 includes a memory 81a, which stores, in advance, a unique ID code of the electronic key 80.

The verification ECU 71 intermittently and repeatedly transmits a request signal Srq from the exterior LF transmitter 72 with controlled timing to form a communication area around the vehicle 1. When the electronic key 80 enters the communication area and the LF receiver 82 receives the request signal Srq, the communication control unit 81 returns an ID code signal Sid in response from the UHF transmitter 83. The ID code signal Sid includes the ID code registered in the memory 81a. When the UHF receiver 74 receives the ID code signal Sid, the verification ECU 71 verifies the ID code of the electronic key 80 with the ID code registered in the memory 71a (exterior verification). When the exterior verification is accomplished, the verification ECU 71 permits or performs the unlocking of the vehicle doors with a door locking device (not shown).

When the vehicle doors are unlocked after the exterior verification is accomplished, the verification ECU 71 transmits the request signal Srq from the interior LF transmitter 73 and forms an interior communication area in the vehicle, preferably in the entire vehicle. When the user who is carrying the electronic key 80 enters the interior communication area and the LF receiver 82 receives the request signal, the communication control unit 81 returns an ID code signal Sid in response from the UHF transmitter 83. The ID code signal Sid includes the ID code registered in the memory 81a. When the UHF receiver 74 receives the ID code signal Sid, the verification ECU 71 verifies the ID code of the electronic key 80 with the ID code registered in the memory 71a (interior verification). When the interior verification is accomplished, the verification ECU 71 permits the hybrid system 3 to start operating.

In one example, the electronic key system 70 further performs ID code verification when charging the battery 4 with the external power supply 61. The vehicle 1 includes a charge ECU 75 that controls charging. The charge ECU 75 is connected by an in-vehicle local area network (LAN) to the verification ECU 71 in a communicable manner. This allows the charge ECU 75 to check the ID verification result of the verification ECU 71. The charge ECU 75 is electrically connected to a switch 76, which is arranged in the vehicle. Further, the charge ECU 75 is electrically connected to a lock device 100, which is arranged in the inlet 5. The lock device 100 includes a plug lock mechanism 120, which is switched between a plug lock state and a plug unlock state. In the plug lock state, the plug lock mechanism 120 restricts movement of the power supplying plug 10 in the directions in which the power supplying plug 10 is fitted to and removed from the inlet 5. In the plug unlock state, the plug lock mechanism 120 permits movement of the power supplying plug 10 in the directions in which the power supplying plug 10 is fitted to and removed from the inlet 5. The lock device 100 also includes a lid lock mechanism 150, which is switched between a lid lock state and a lid unlock state. In the lid lock state, the lid lock mechanism 150 restricts movement of the lid 40 in the direction the lid 40 opens. In the lid unlock state, the lid lock mechanism 150 permits such movement of the lid 40. Further, the lock device 100 includes an actuator 160. The actuator 160 switches the plug lock mechanism 120 between the plug lock state and the plug unlock state and switches the lid lock mechanism 150 between the lid lock state and the lid unlock state. The actuator 160 is one example of a drive mechanism.

The charge ECU 75 switches the plug lock mechanism 120 between the plug lock state and the plug unlock state in accordance with the result of an exterior verification performed in response to the operation of the switch 76. This permits and prohibits connection of the power supplying plug 10 to the inlet 5. When the charge ECU 75 receives a connection signal from the charge device 62 indicating that the power supplying plug 10 has been connected to the inlet 5, the charge ECU 75 controls the converter 6 to start charging the battery 4 with power from the external power supply 61 and switches the plug lock mechanism 120 to the plug lock state. To disconnect the power supplying plug 10 from the inlet 5, the user operates the switch 76 again. If the switch 76 is operated, the charge ECU 75 switches the plug lock mechanism 120 to the plug unlock state after determining that the verification ECU 71 has accomplished vehicle exterior verification. This permits disconnection of the power supplying plug 10 from the inlet 5. A person who is not carrying the electronic key 80 is prevented from switching the plug lock mechanism 120 from the lock state to the unlock state. Thus, such a person cannot remove the power supplying plug 10 from the inlet 5 and steal electricity or the power supplying plug 10. In a preferred example, the exterior communication area is formed around the entire vehicle. Thus, when the user who is carrying the electronic key 80 stands by the inlet 5 arranged in, for example, a front side surface of the vehicle, vehicle exterior verification is performed without any problems.

In the preferred example, the charge ECU 75 includes a timer 75a, which is activated when the switch 76 is operated. The timer 75a remains active for a predetermined activation period from when it is activated. During the active period, the timer 75a drives the actuator 160. The active period of the timer 75a is preferably the shortest time required to switch the lid lock mechanism 150 from the lid lock state to the lid unlock state and switch the plug lock mechanism 120 from the plug lock state to the plug unlock state. When the switch 76 is operated, the charge ECU 75 checks the ID verification result of the verification ECU 71 in the same manner as when the switch 76 is operated. When the ID verification has been accomplished, the charge ECU 75 activates the timer 75a and drives the actuator 160 during the active period of the timer 75a. The structure of the lock device 100 will be described later.

In the example shown in FIG. 2, the power supplying plug 10 includes a plug body 11 having a basal end 11a connected to a cable 12, which leads to the external power supply 61. The plug body 11 includes a grip 13, which is grasped by the user. The plug body 11 has a distal end 11b that forms a cylindrical power supplying end 14. Connection terminals 15 are arranged in the power supplying end 14. The connection terminals 15 include a power terminal, which forms a power transmission line, and control terminals, which form communication lines for control commands.

A hook 16 is arranged above the power supplying end 14. When the power supplying plug 10 is connected to the inlet 5, the hook 16 is engaged with part of the inlet 5 to keep the power supplying plug 10 and the inlet 5 connected. The plug body 11 pivotally supports the hook 16. The hook 16 is moved between a first position, which is shown by solid lines in FIG. 2, and a second position, which is shown by broken lines in FIG. 2. When the power supplying plug 10 is connected to the inlet 5, the hook 16 is engaged with part of the inlet 5 at the first position and disengaged from the inlet at the second position. Disengagement of the hook 16 from the inlet 5 allows the power supplying plug 10 to be removed from the power supplying plug 10. In the illustrated example, the hook 16 is normally held at the first position in an elastic manner. When a lever 17, which is coupled to the hook 16, is pushed, the hook 16 is moved to the second position (tilted position). When the lever 17 is released, the hook 16 elastically returns to the first position.

As shown in FIG. 3, the inlet 5 includes an inlet body 5a. The inlet body 5a of the inlet 5 includes a cylindrical power reception end 5b, which receives the power supplying end 14 of the power supplying plug 10. The power reception end 5b includes connection terminals 29. The connection terminals 29 include a power terminal, which forms a power transmission line, and control terminals, which form communication lines for control commands. When the power supplying plug 10 is connected to the inlet 5, the power terminals of the power reception end 5b and the power supplying end 14 are connected. Further, the control terminals of the power reception end 5b and the power supplying end 14 are connected.

Further, referring to FIG. 3, a hook seat 21, which may be engaged with the hook 16, is formed on the upper peripheral surface of the inlet body 5a. The hook seat 21 includes a slope 5c formed at a distal side (plug side). The hook seat 21 includes a groove, or recess 21a, that receives the hook 16 and allows the hook 16 to tilt. The recess 21a includes an inner surface 21b located at the plug side. Engagement of the hook 16 with the inner surface 21b restricts removal of the power supplying plug 10 from the inlet 5.

Figure 4:
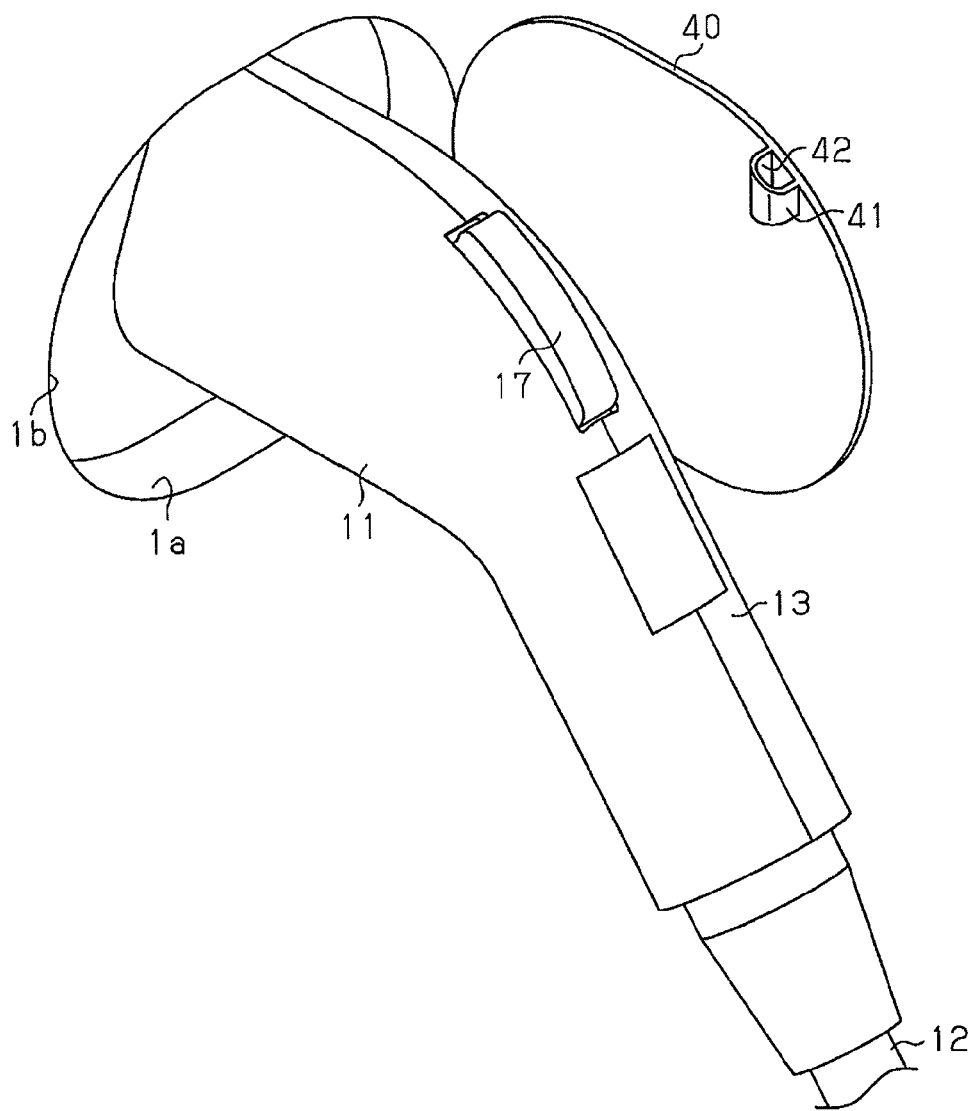
FIG. 4 is a perspective view of an inlet accommodation portion.

Referring to FIG. 4, the inlet accommodation portion 1a is closed by the lid 40, which may be supported by a hinge. The lid 40 includes an outer surface that forms part of the outer surface of the vehicle 1. The lid 40 protects the inlet 5 from the ambient environment. The lid 40 includes a latch hole 42. In the illustrated example, the latch hole 42 is an opening vertically extending through a generally U-shaped plate 41, which is fixed to the inner surface of the lid 40. Preferably, an urging member (not shown) constantly urges the lid 40 in an opening direction.

The lock device 100 will now be described.

Figure 5:
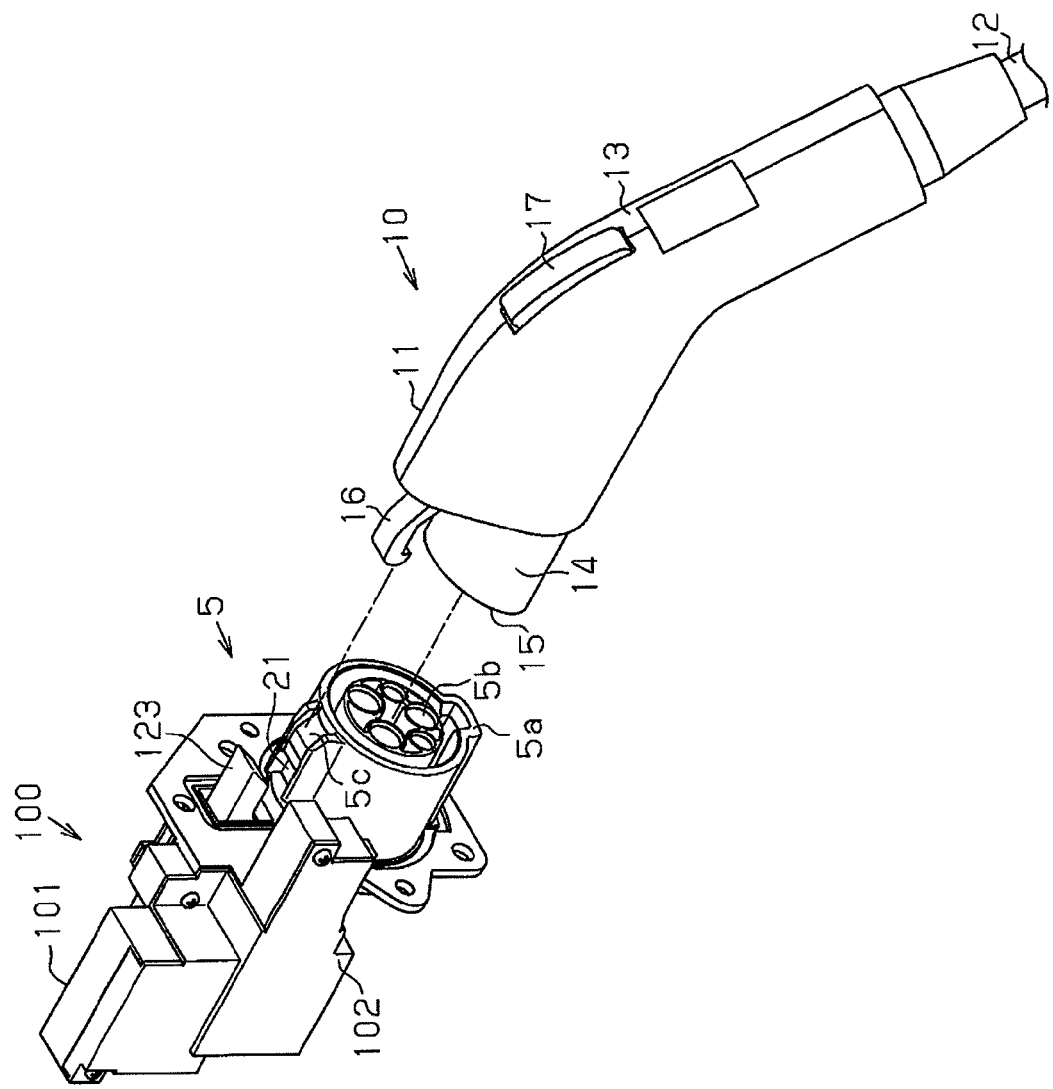
FIG. 5 is a perspective view of the power supplying plug and the inlet.

Referring to FIGS. 5 and 6, the lock device 100 may be accommodated in a case 101, which is a part of the inlet 5 and may be formed integrally with an upper portion of the inlet body 5a. A case cover 102 and an end cover 103 are coupled to the case 101. As shown in FIG. 5, the case cover 102 closes a left opening of the case 101. As shown in FIG. 7, the end cover 103 closes a right opening of the case 101.

The actuator 160 of the lock device 100 will now be described. As shown in FIG. 6, the actuator 160 includes a motor 161 (drive source), a worm gear 162, and a helical gear 163. In the illustrated example, the actuator 160 is arranged between the case 101 and an inner case (not shown), which is fixed to the left open end of the case 101.

Referring to FIG. 6, the motor 161 is fixed to the inner case (not shown) so that a motor shaft of the motor 161 extends toward the right. The worm gear 162 is fixed to the motor shaft and rotates integrally with the motor shaft. The worm gear 162 is engaged with the helical gear 163. The helical gear 163 includes a rotation axis extending in the outward direction. The inner case supports the helical gear 163 to be rotatable about the rotation axis. The helical gear is engaged with the lower side of the worm gear 162. Rotation of one of the worm gear 162 and the helical gear 163 rotates the other one of the worm gear 162 and the helical gear 163. For example, when the motor 161 produces forward rotation, the helical gear 163 is rotated in the clockwise direction as viewed from the outer side.

As shown in FIG. 6, a cylindrical first pin 164 and a cylindrical second pin 165 project from opposite sides of the helical gear 163. Rotation of the helical gear 163 rotates the first and second pins 164 and 165 about the rotation axis of the helical gear 163. The two pins 164 and 165 may be cantilevers supported by opposite sides of the helical gear 163. The first pin 164 is one example of a first rotation engagement portion. The second pin 165 is one example of a second rotation engagement portion.

Figure 9A:
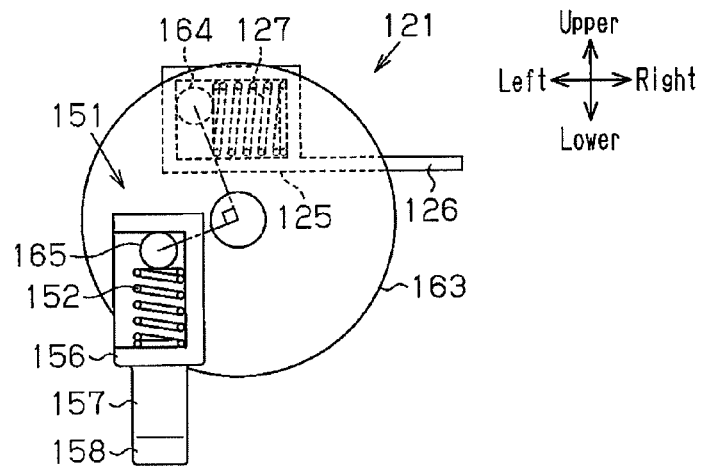
FIG. 9A is a front view showing a helical gear when the lock device is in a first state.

As shown in FIG. 9A, the first pin 164 and the second pin 165 are separated about the rotation axis of the helical gear 163 by a predetermined angle, for example, 90 degrees. In the illustrated example, the first pin 164 is separated by a predetermined angle in the clockwise direction from the second pin 165.

The first pin 164 and the second pin 165 may be arranged at locations separated by different distances from the rotation axis (center) of the helical gear 163 in the radial direction of the helical gear 163. In the illustrated example, the first pin 164 is relatively far from the center of the helical gear 163, and the second pin 165 is relatively close to the center of the helical gear 163.

The plug lock mechanism 120 of the lock device 100 will now be described. As shown in FIG. 7, the plug lock mechanism 120 includes a hook stopper control member 121 (plug restriction member) and a hook stopper 123 (cooperative member). When the helical gear 163 rotates, the hook stopper control member 121 moves between a retracted position and a projected position to mechanically switch the hook stopper 123 between a pivotal state and a fixed state, in which pivoting is prohibited. In one example, the hook stopper control member 121 and the hook stopper 123 are accommodated in the case 101 at the right side of the motor 161.

Referring to FIG. 8, the case 101 includes a hook stopper control member accommodation portion 110, which accommodates the hook stopper control member 121, and a hook stopper accommodation portion 111, which accommodates the hook stopper 123. The hook stopper accommodation portion 111 is in communication with the hook stopper control member accommodation portion 110.

Referring to FIG. 6, the hook stopper control member 121 includes a box 125 and a tab 126, which is a flat plate extending from the box 125. The box 125 accommodates a first coil spring 127 that serves as a first elastic member. The first coil spring 127 includes a free end and a fixed end, which is connected to the wall adjacent to the tab 126 in the box 125. The first pin 164 is arranged in the box 125 between the wall opposite to the tab 126 and the free end of the first coil spring 127. The first coil spring 127 is held in a compressed state and constantly urges the hook stopper control member 121 toward the right. However, rightward movement of the hook stopper control member 121 is restricted by contact between the left wall of the hook stopper control member 121 and the first pin 164.

In the box 125, the distance between the inner surface of the lower wall and the inner surface of the upper wall is preferably set to be greater than the distance the first pin 164 moves in the vertical direction when the helical gear 163 rotates. In this case, even when the helical gear 163 rotates and moves the first pin 164 in upward and downward directions, the first pin 164 does not contact the upper and lower walls of the box 125. Thus, when the helical gear 163 rotates and moves the first pin 164 in the leftward, rightward, upward, and downward directions, the hook stopper control member 121 moves only in the leftward and rightward directions (horizontal direction), and the tab 126 moves only in the upward and downward directions (horizontal direction). This moves the tab 126 between a hook stopper lock position, which is located in the movement path of the hook stopper 123 as shown by the solid lines in FIG. 100, and a hook stopper unlock position, which is not located in the movement path of the hook stopper 123 as shown by the double-dashed lines in FIG. 9C. The box 125 of the hook stopper control member 121 is one example of a first conversion portion.

As shown in FIG. 8, the hook stopper control member accommodation portion 110 is in communication with the hook stopper accommodation portion 111. The hook stopper accommodation portion 111 has an opening facing the upper side of the hook seat 21.

As shown in FIG. 8, a pivot 140 supports the hook stopper 123. The hook stopper 123 is, for example, T-shaped, and includes a horizontal member 137 and a vertical member 138, which extends downward from a central portion of the horizontal member 137. A through hole 139 extends through the distal end of the vertical member 138. The pivot 140 is inserted through the through hole 139. The pivot 140 is rotatably supported by the case 101 and the end cover 103, which closes the right opening of the case 101.

The horizontal member 137 includes an inner end 141 located between the tab 126 of the hook stopper control member 121 and the upper wall of the hook stopper control member accommodation portion 110. The hook stopper 123 is movable between a horizontal position shown by the solid lines in FIG. 8 and a tilted position shown by the double-dashed lines in FIG. 8. At the horizontal position, the upper surface of the inner end 141 of the horizontal member 137 is in contact with the upper wall of the hook stopper control member accommodation portion 110. At the tilted position, the lower surface of the inner end 141 of the horizontal member 137 is located between the tab 126 and the lower wall of the hook stopper control member accommodation portion 110. The pivot path of the inner end 141 of the inner end 141 of the horizontal member 137 about the pivot 140 includes the movement path of the hook stopper control member 121. Accordingly, as shown in FIG. 100, when the tab 126 is located at the hook stopper lock position and arranged in the pivot path of the inner end 141 of the horizontal member 137, the hook stopper 123 comes into contact with the tab 126. This prohibits movement of the hook stopper 123 from the horizontal position to the tilted position.

A torsion spring 116 is arranged on the pivot 140. The two ends of the torsion spring 116 are respectively engaged with the lower surface of the inner end of the horizontal member 137 and the lower wall of the hook stopper control member accommodation portion 110. The elastic force of the torsion spring 116 constantly urges the inner end of the horizontal member 137 upward. Thus, the hook stopper 123 is maintained at the horizontal position in a normal state.

Referring to FIG. 8, the outer end of the horizontal member 137 defines a hook lock 142 that projects above the hook seat 21. The distal end of the hook lock 142 includes a hook guide surface 143 gradually inclined upward toward the outer side. Thus, when the hook stopper 123 is located at the hook stopper unlock position and, for example, the hook guide surface 143 is pushed by the hook 16 from the outer side to the inner side, the hook stopper 123 is pivoted toward the right about the pivot 140 and moved to the tilted position.

The lid lock mechanism 150 will now be described. As shown in FIG. 6, the lid lock mechanism 150 includes a lid latch 151, which serves as a lid restriction portion that restricts movement of the lid 40 in the direction the lid 40 opens, and a second coil spring 152, which serves as a second elastic member that urges the lid latch 151 toward the lid lock position.

As shown in FIG. 7, the case 101 includes a lid latch accommodation portion 117 at the upper left side of the inlet 5 to accommodate the lid latch 151. The lower wall of the lid latch accommodation portion 117 includes a round bar insertion hole 119. The bar insertion hole 119 is opposed to the latch hole 42 when the lid 40 is closed.

Figure 9B:
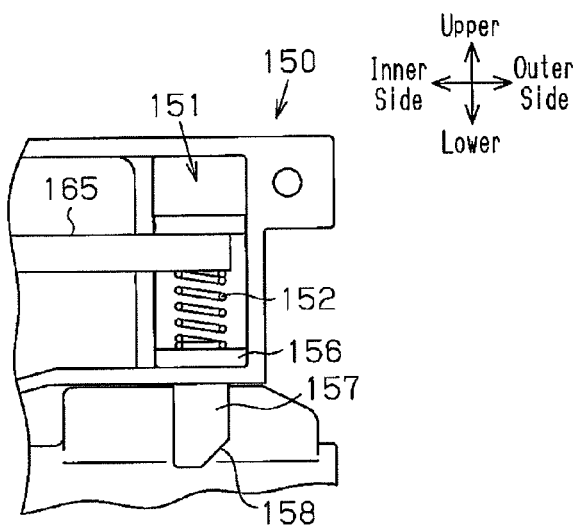
FIG. 9B is a left view showing a lid latch when the lock device is in the first state.

As shown in FIG. 6, the lid latch 151 includes a transmission portion 156 and a pin 157. The transmission portion 156 serves as a second conversion portion and includes an upper wall, a right wall, and a lower wall arranged in a U-shaped form. The length of a diagonal line of the bottom wall of the transmission portion 156 is set to be greater than the diameter of the bar insertion hole 119. Thus, as shown in FIG. 9B, the lid latch 151 is accommodated in the lid latch accommodation portion 117 with the transmission portion 156 engaged with the lower wall of the lid latch accommodation portion 117 and the pin 157 projected from the bar insertion hole 119 (lid lock position). The distal end of the pin 157 defines a bar guide surface 158 gradually inclined downward toward the inner side. The bar guide surface 158 is located in the pivotal path of the U-shaped plate 41 (latch hole 42), which moves when the lid 40 opens and closes the inlet accommodation portion 1a. Thus, referring to FIG. 10B, when the U-shaped plate 41 pushes the bar guide surface 158 from the outer side toward the inner side, the lid latch 151 is moved to a lid unlock position in which an upper section of the pin 157 is accommodated in the lid latch accommodation portion 117. This permits further inward movement of the lid 40.

As shown in FIG. 6, a second coil spring 152 is accommodated between the upper wall and lower wall of the transmission portion 156. The second coil spring 152 includes one end fixed to the inner surface of the lower wall. The second pin 165 is arranged between the other end of the second coil spring 152 and the inner surface of the upper wall. The second coil spring 152 constantly urges the lower wall of the transmission portion 156 downward.

The length of the upper wall in the horizontal direction is set to be greater than the movement distance of the second pin 165 in the horizontal direction when the helical gear 163 rotates. Accordingly, even when the second pin 165 moves in the horizontal direction as the helical gear 163 rotates, the second pin 165 does not come into contact with the right wall or fall out of the left opening. Thus, when the helical gear 163 rotates and moves the second pin 165 in the leftward, rightward, upward, or downward directions, the lid latch 151 moves only in the upward or downward direction. This moves the pin 157 between a lid lock position, which is located in the movement path of the U-shaped plate 41 (latch hole 42) as shown in FIG. 9B, and a lid unlock position, which is not located in the movement path of the U-shaped plate 41.

Figure 9C:
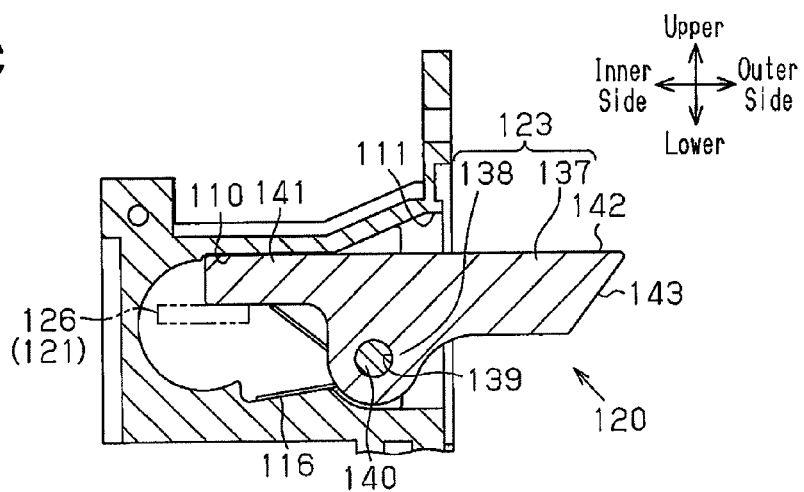
FIG. 9C is a cross-sectional view showing a hook lock shaft and a hook stopper engaged with each other when the lock device is in the first state.

The operation of the lock device 100 when charging the battery 4 with the power supplying plug 10 will now be described. The description hereafter will be given under the assumption that the travel drive source of the vehicle 1 is stopped. Here, as shown in FIG. 9A, the first pin 164 is located at the eleven o'clock position, and the second pin 165 is located at the eight o'clock position. Thus, the hook stopper control member 121 is located at the hook stopper unlock position as shown in FIG. 9C, and the lid latch 151 is located at the lid lock position as shown in FIG. 9B. Under this situation, the lock device 100 is in a first state. Here, the lid 40 is closed. Accordingly, the lid 40 protects the inlet 5 from the ambient environment, and the power supplying plug 10 cannot be connected to the inlet.

When the user pushes the switch 76, the charge ECU 75 receives a signal indicating that the switch 76 has been operated. Then, the charge ECU 75 checks the exterior verification result of the verification ECU 71. After determining that the exterior verification has been accomplished, the charge ECU 75 activates the timer 75a and outputs a drive signal to drive the motor 161 and produce forward rotation during the period the timer 75a is activated.

Figure 10A:
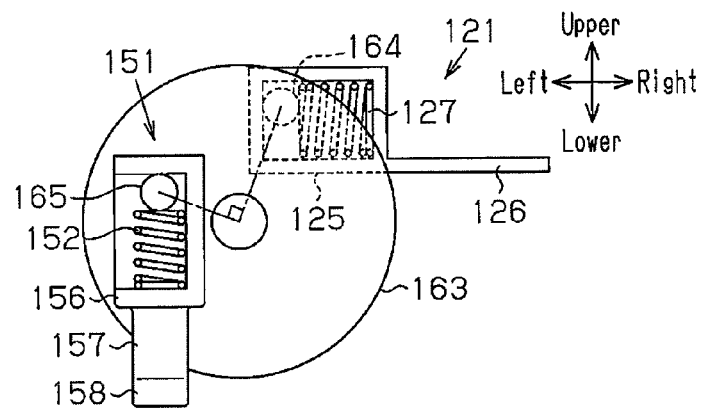
FIG. 10A is a front view showing the helical gear when the lock device is in a second state.
Figure 10B:
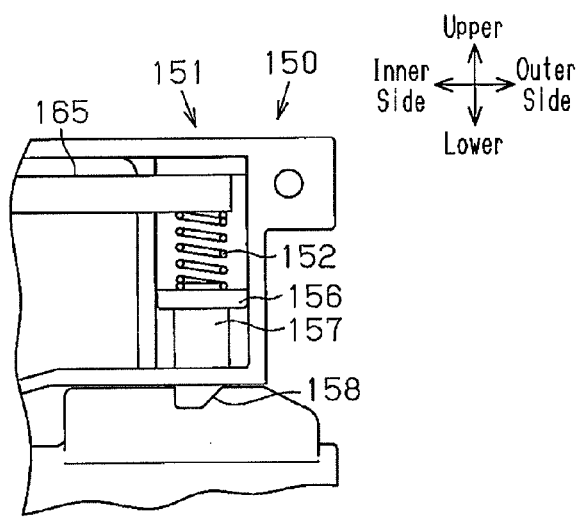
FIG. 10B is a left view showing the lid latch when the lock device is in the second state.
Figure 10C:
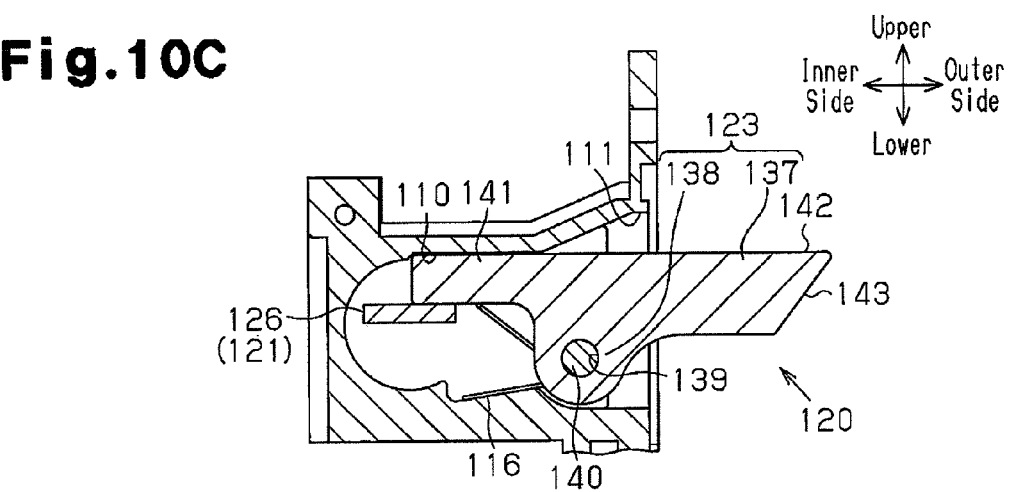
FIG. 10C is a cross-sectional view showing the hook lock shaft and the hook stopper engaged with each other when the lock device is in the second state.

When the motor 161 produces forward rotation, the helical gear 163 rotates in the clockwise direction and the lock device 100 shifts to a second state, which is shown in FIGS. 10A to 10C. Referring to FIG. 10A, rotation of the helical gear 163 in the clockwise direction arranges the first pin 164 at the one o'clock position and the second pin 165 at the ten o'clock position. That is, the first pin 164 is moved in the rightward direction, and the second pin 165 is moved in the upward direction. As a result, the hook stopper control member 121 is moved in the rightward direction to the hook stopper lock position, and the lid latch 151 is moved in the upward direction to the lid unlock position. This removes the lid latch 151 from the latch hole 42. The lid 40 is urged by an urging means (not shown) in an opening direction. Thus, the removal of the lid latch 151 from the latch hole 42 moves the lid 40 in the opening direction. Accordingly, the lid 40 opens the inlet 5.

Immediately after the lock device 100 shifts to the second state, the charge ECU 75 activates the timer 75a again and outputs a drive signal that drives the motor 161 to produce reverse rotation during the period the timer 75a is active. This rotates the helical gear 163 in the counterclockwise direction and shifts the lock device 100 again to the first state shown in FIGS. 9A to 9C. Here, the lid 40 is open and the hook stopper control member 121 is located at the hook stopper unlock position as shown in FIG. 9B. That is, movement of the hook stopper 123 to the tilted position is permitted. This allows for the power supplying plug 10 to be connected to the inlet 5.

Figure 11:
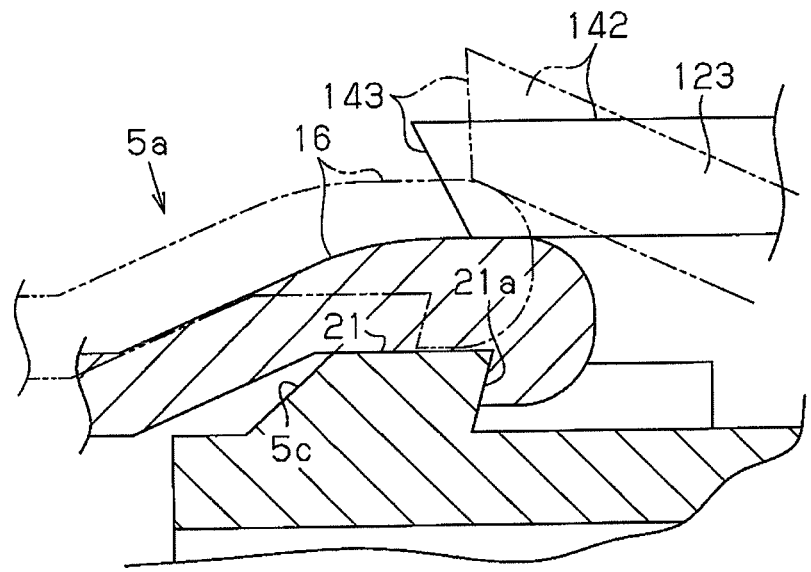
FIG. 11 is a cross-sectional view showing a power supplying plug hook connected to a hook seat of the inlet.

Referring to FIG. 5, the power supplying end 14 is aligned with the power reception end 5b, and the hook 16 is engaged with the recess 21a of the hook seat 21. Then, the power supplying plug 10 is moved toward the inlet 5. Referring to FIG. 11, this guides the hook 16 along the slope 5c and moves the hook 16 upward against the elastic force acting to hold the hook 16 at the first position. Further movement of the power supplying plug 10 toward the inlet 5 moves the hook 16 over the slope 5c as shown by the broken lines in FIG. 15 until reaching the recess 21a. The distal portion of the hook 16 pushes the hook guide surface of the hook stopper 123 and moves the hook stopper 123 to the tilted position. By further moving the power supplying plug toward the inlet 5, the elastic force acting to hold the hook 16 at the first position moves the hook 16 downward. This engages the hook 16 with the inner surface 21b of the recess 21a, as shown by the solid lines in FIG. 11. Consequently, the connection terminals 15 of the power supplying plug 10 are connected in a preferable manner with the connection terminals 29 of the inlet 5. This electrically connects the power supplying plug 10 and the inlet 5.

When the power supplying plug 10 is connected to the inlet 5, the charge ECU 75 receives a connection signal from the charge device 62. The charge ECU 75 recognizes the connection of the power supplying plug 10 and the inlet 5 when receiving the connection signal. Then, the charge ECU 75 starts charging the battery 4 with power from the external power supply 61, and outputs a drive signal that drives and produces forward rotation with the motor 161 during the period the timer 75a is active.

When the motor 161 is driven to produce forward rotation, the lock device 100 shifts to the second state shown in FIGS. 10A to 10C. That is, the hook stopper control member 121 is located at the hook stopper lock position as shown in FIG. 10C. Accordingly, the hook 16 cannot be moved to the tilted position. Thus, removal of the power supplying plug 10 from the inlet 5 is continuously restricted.

The operation of the lock device 100 when removing the power supplying plug 10 from the inlet 5 will now be described.

When the switch 76 is operated and the charge ECU 75 receives a signal indicating that the switch 76 has been operated, the charge ECU 75 checks the external verification result of the verification ECU 71. After determining that the external verification has been accomplished, the charge ECU 75 activates the timer 75a and outputs a drive signal that drives the motor 161 in the reverse direction during the period the timer 75a is active.

When the motor 161 is driven to produce reverse rotation, the lock device 100 shifts to the first state shown in FIGS. 9A to 9C. Accordingly, the hook stopper control member 121 is located at the hook stopper unlock position as shown in FIG. 9C and allows the hook 16 to be moved to the tilted position. This permits disengagement of the hook 16 from the recess 21a and thereby allows for removal of the power supplying plug 10 from the inlet 5.

Figure 12:
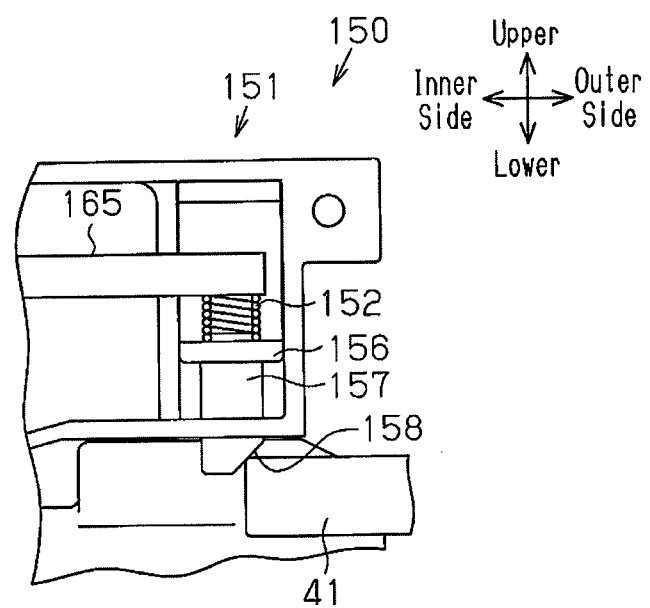
FIG. 12 is a left view showing the lid latch in contact with a portion of a lid.

When the power supplying plug 10 is removed from the inlet 5, the lock device 100 is in the first state. That is, the lid latch 151 is located at the lid lock position as shown in FIG. 9B. When closing the lid 40 under this situation, referring to FIG. 12, the U-shaped plate 41 comes into contact with the bar guide surface 158 of the lid latch 151 and lifts the lid latch 151 against the elastic force of the second coil spring 152. This allows the lid 40 to close. When the lid 40 fully closes, the latch hole 42 is aligned with the bar insertion hole 119, and the elastic force of the second coil spring 152 moves the lid latch 151 to the lid lock position and into the latch hole 42. This restricts opening of the lid 40.

When the motor 161 is driven to produce forward rotation, the hook stopper control member 121 is moved from the hook stopper lock position to the hook stopper unlock position. Under such a situation, for one reason or another, the hook 16 may remain at the tilted position, and the hook stopper 123 may be located at the hook stopper lock position of the hook stopper control member 121. In this case, movement of the hook stopper control member 121 to the hook stopper lock position is restricted. However, the elastic deformation of the first coil spring 127 restricts the movement of the first pin 164, that is, the rotation of the helical gear 163. Thus, excessive external force is not applied to the helical gear 163 and, consequently, the motor 161.

(1) The second coil spring 152 urges the lid latch 151 toward the lid lock position. Further, the distal end of the lid latch 151 includes the bar guide surface 158 that moves the lid latch to the lid unlock position when pushed by the U-shaped plate 41 of the lid 40. This moves the lid latch 151 to the lid lock position and into the latch hole 42 just by closing the lid 40. This keeps the opening 1b closed by the lid 40. In this manner, the same motor 161 can be used to unlock the lid 40 and lock and unlock the hook 16. The motor 161 does not have to be operated when locking the lid 40, and the lid 40 may be locked just by closing the lid 40. This improves convenience.

(2) The helical gear 163 includes the first pin 164 that rotates about the rotation axis of the helical gear 163. The hook stopper control member 121 includes the box 125. The first pin 164 is arranged in the box 125. In the box 125, the distance between the inner surface of the lower wall and the inner surface of the upper wall is set to be greater than the vertical movement direction of the first pin 164, which moves when the helical gear 163 rotates. Thus, when the helical gear 163 rotates and moves the first pin 164 in the leftward, rightward, upward, and downward directions, the hook stopper control member 121 moves only in the leftward and rightward directions. In this manner, the box 125, which has a simple structure, converts the rotating motion of the first pin 164 to linear motion.

(3) The helical gear 163 includes the second pin 165 that rotates about the rotation axis of the helical gear 163. The lid latch 151 includes the C-shaped transmission portion 156. The second pin 165 is arranged in the transmission portion 156. The length of the upper wall of the transmission portion 156 in the horizontal direction is set to be greater than the movement distance of the second pin 165 in the horizontal direction when the helical gear 163 rotates. Thus, when the helical gear 163 rotates and moves the second pin 165 in the leftward, rightward, upward, or downward directions, the lid latch 151 moves only in the upward or downward direction. This moves the pin 157 in only the upward or downward direction. In this manner, the C-shaped transmission portion 156, which has a simple structure, converts the rotating motion of the second pin 165 to a linear motion.

(4) The first coil spring 127 is arranged between the first pin 164 and the hook stopper control member 121. Thus, for example, when the hook 16 remains at the tilted position and hinders movement of the hook stopper control member 121 to the hook stopper lock position, the motor 161 may rotate the helical gear 163 and move the first pin 164. However, the elastic deformation of the first coil spring 127 prevents excessive external force from being applied to the helical gear 163 and the motor 161. This avoids damages of the lock device 100.

The above embodiment may be modified as described below.

In the above embodiment, the helical gear 163 is used as a rotating body. However, referring to FIG. 13A, a spur gear 163a may be used as the rotating body. In this case, the worm gear 162 is changed to, for example, a pinion gear 162a. This obtains the same advantages as the above embodiment.

In the above embodiment, the hook stopper control member 121 engages the inner end 141 of the hook lock 142, which engages the hook 16, of the hook stopper 123. This restricts movement of the hook stopper 123 to the tilted position, and keeps the power supplying plug 10 connected to the inlet 5. However, the hook stopper control member 121 may engage the hook lock 142 to keep the inlet connected to the power supplying plug 10.

In the above embodiment, the hook stopper control member 121 moves straight to restrict and allow movement of the hook stopper 123 to the tilted position. Instead, the hook stopper control member 121 may be rotated.

Figure 13A:
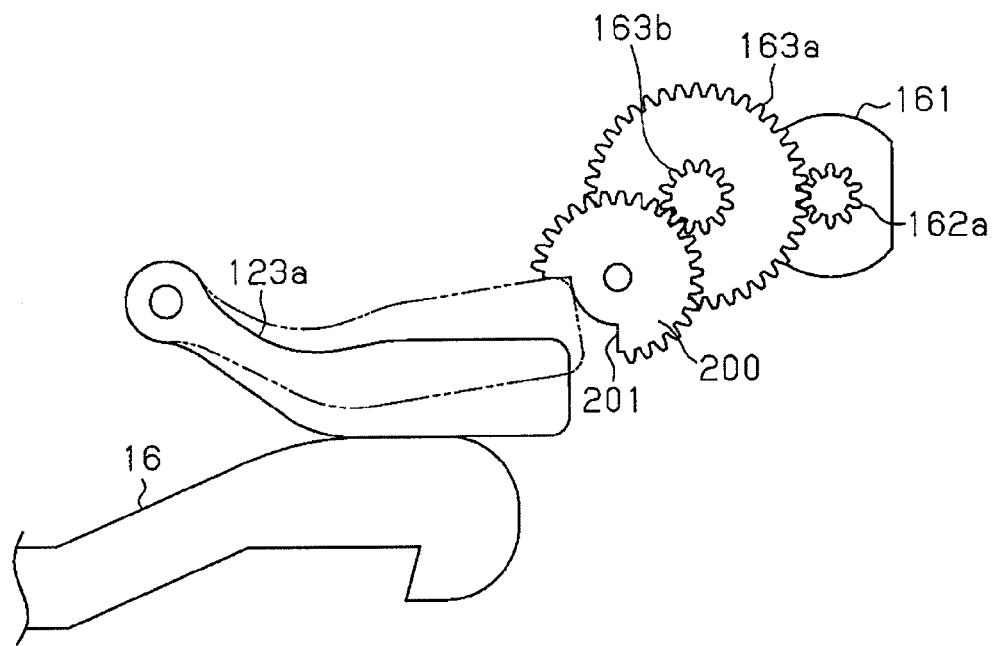
FIGS. 13A and 13B are cross-sectional views showing further examples of a lock device.
Figure 13B:
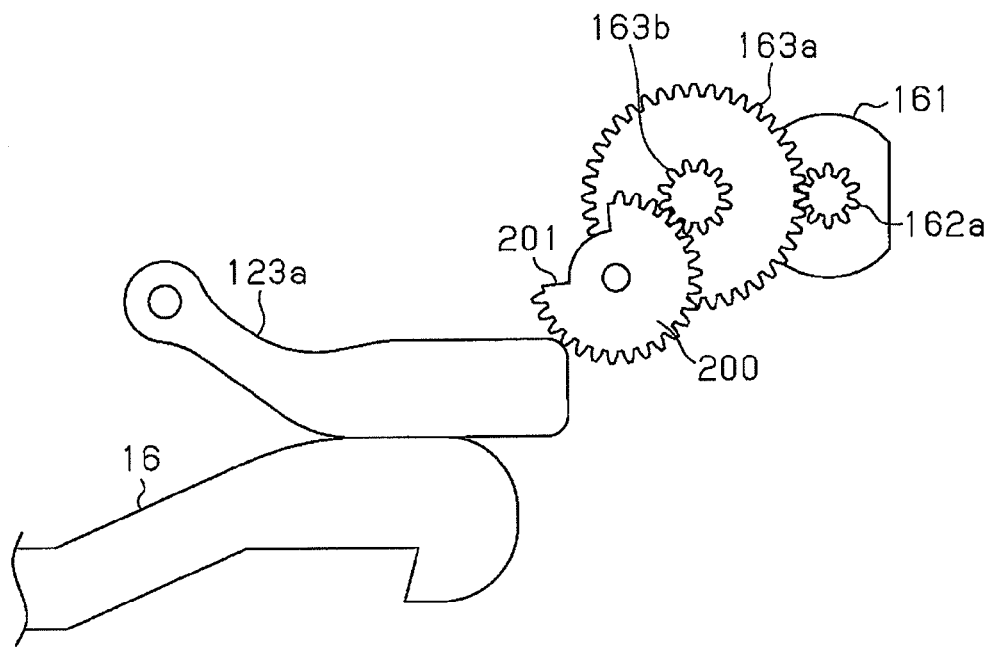

Referring to FIG. 13A, a hook stopper control member 200 including straight teeth, which are formed in its circumferential surface, and a cutaway portion 201 may be used. The cutaway portion 201 extends, for example, from the six o'clock position to the nine o'clock position. A rotating body (e.g., spur gear 163a), which is driven by the motor 161, is engaged with a pinion gear 163b. The teeth of the hook stopper control member 200 are engaged with the pinion gear 163b. For example, as shown in FIG. 13A, the cutaway portion 201 is arranged in the movement path of the hook stopper 123a. This permits movement of the hook stopper 123a to the tilted position. Rotation of the rotating body (e.g., spur gear 163a) rotates the hook stopper control member 200. As shown in FIG. 13B, when the cutaway portion 201 moves to extend from the nine o'clock position to the twelve o'clock position, the hook stopper control member 200 is arranged in the movement path of the hook stopper 123a. This restricts movement of the hook stopper 123a to the tilted position. Such a structure also obtains the advantages of the above embodiment.

In the above embodiment, the transmission portion 156 of the lid latch 151 is C-shaped but may be box-shaped instead like the box 125 of the hook stopper control member 121. Further, the box 125 may be shaped like the transmission portion 156. Such structures obtain the same advantages as the above embodiment.

In the above embodiment, the pin 157 of the lid latch 151 may be a flat plate like the tab 126 of the hook stopper control member 121, and the tab 126 may be cylindrical like the pin 157. Such structures obtain the same advantages as the above embodiment.

In the above embodiment, the first coil spring 127 may be omitted.

In the above embodiment, the second coil spring 152 may be omitted. In this case, for example, the lid latch 151 is constantly urged by its own weight toward the lid lock position.

In the above embodiment, the motor 161 is driven when the timer 75a is active. However, the motor 161 does not have to be driven and controlled in such a manner. For example, when the lid latch 151 is located at the lid lock position and the lid unlock position, the lid latch 151 pushes a microswitch. Further, when the motor 161 is being driven, the charge ECU 75 stops the motor 161 when the lid latch 151 pushes the lid latch 151. Such a structure obtains the same advantages as the above embodiment. This arrangement is not limited to the lid latch 151 and may also be applied to the hook stopper control member 121.

In the above embodiment, a manual operation lever may be directly connected to the motor shaft of the motor 161. A manual operation lever may also be arranged on the helical gear 163. In such structures, the manual operation levers may be used to manually rotate the helical gear 163. Thus, even when the motor 161 is defective, switching may be performed between lid lock and lid unlock states and between plug lock and plug unlock states.

In the above embodiment, the lid 40 is urged by an urging means (not shown) toward the opening direction. However, the urging means may be omitted.

In the above embodiment, the inlet 5 is arranged in the side surface of the vehicle 1. However, the inlet 5 may be arranged in, for example, a front surface of the vehicle.

In the above embodiment, the hook 16 is arranged above the power supplying end 14. The hook 16 may be arranged at a plurality of locations on the power supplying end 14, such as on the upper and lower portions of the power supplying end 14.

In the above embodiment, the hook 16 is formed on the power supplying plug 10, and the hook seat 21 is arranged on the inlet 5. This may be reversed.

In the above embodiment, the motor 161 is used as the driving means. However, another driving means such as a rotary solenoid may be used.

In the above embodiment, key authentication is performed through the ID verification of the electronic key 80. Instead, key authentication may be performed through mechanical verification of a mechanical key.

In the above embodiment, the electronic key system 70 may employ an immobilizer system that uses a transponder to transmit the ID code.

In the above embodiment, the frequency used by the electronic key system 70 is not necessarily limited to LF and UHF and other frequencies may be used. Further, the frequency for transmitting radio waves to the electronic key 80 from the vehicle and the frequency for returning radio waves to the vehicle 1 from the electronic key 80 do not necessarily have to be different and may be the same.

In the above embodiment, user authentication is not necessarily limited to the key verification that uses the electronic key 80. For example, a different verification such as biometric verification may be performed.

The above embodiment is applied to the inlet 5 of the plug-in hybrid vehicle 1. Instead, the above embodiment may be applied to the inlet of an electric vehicle.

In the above embodiment, the lock device 100 of the present example is not necessarily applied to only the vehicle 1. The lock device 100 may be applied to any apparatus or appliance that includes a rechargeable battery.

The above modifications may be combined with each other or with the preferred embodiment.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A lock device that locks a lid and a power supplying plug, wherein the lid protects a power reception connector, the lock device comprising:
    a plug restriction member that moves between a plug lock position and a plug unlock position, wherein the plug restriction member restricts removal of the power supplying plug from the power reception connector at the plug lock position, and the plug restriction member permits removal of the power supplying plug from the power reception connector at the plug unlock position;

a lid restriction member that moves between a lid lock position and a lid unlock position, wherein the lid restriction member engages the lid and restricts opening of the lid at the lid lock position, the lid restriction member permits opening of the lid at the lid unlock position, and the lid restriction member is constantly urged toward the lid lock position; and a drive mechanism including a drive source and a rotating body, wherein the drive source generates drive force and rotates the rotating body in first and second directions, wherein the drive mechanism is connected to the plug restriction member to move the plug restriction member from the plug unlock position to the plug lock position when the rotating body rotates in the first direction, the drive mechanism is connected to the lid restriction member to move the lid restriction member from the lid unlock position to the lid lock position against an urging force acting on the lid restriction member when the rotating body is rotated in the second direction, when closing the lid with the lid restriction member held at the lid lock position, the lid restriction member engages the closing lid and moves toward the lid unlock position thereby permitting the lid to close, and the lid restriction member is formed to be returned to the lid lock position by the urging force at a timing at which the lid reaches a close position.

2. The lock device according to claim 1, wherein
the rotating body includes a first rotation engagement portion that rotates about a rotation axis of the rotating body, and
the plug restriction member includes a first conversion portion that converts, when the rotating body rotates, rotating motion of the first rotation engagement portion to linear motion of the plug restriction member between the plug lock position and the plug unlock position.

3. The lock device according to claim 1, wherein
the rotating body includes a second rotation engagement portion that rotates about a rotation axis of the rotating body, and
the lid restriction member includes a second conversion portion that converts, when the rotating body rotates, rotating motion of the second rotation engagement portion to linear motion of the lid restriction member between the lid lock position and the lid unlock position.

4. The lock device according to claim 2, wherein
the power supplying plug includes a movable hook,
the power reception connector includes a hook seat, which engages the hook, and a cooperative member, which moves in cooperation with the hook along a movement path when contacting the hook, and
the plug restriction member rotates in a range between the plug lock position, which is located in the movement path of the cooperative member, and the plug unlock position, which is separated from the movement path.

5. The lock device according to claim 4, further comprising a first elastic member that constantly urges the plug restriction member toward the plug lock position, wherein the first elastic member is arranged between the first rotation engagement portion and the plug restriction member.

6. The lock device according to claim 1, wherein
the rotating body includes first and second rotation engagement portions rotated about a rotation axis of the rotating body;
the plug restriction member includes a first conversion portion that converts, when the rotating body rotates, rotating motion of the first rotation engagement portion to linear motion of the plug restriction member between the plug lock position and the plug unlock position; and
the lid restriction member includes a second conversion portion that converts, when the rotating body rotates, rotating motion of the second rotation engagement portion to linear motion of the lid restriction member between the lid lock position and the lid unlock position.

7. The lock device according to claim 1, wherein
the rotating body includes first and second cantilevers extending parallel to a rotation axis of the rotating body in opposite directions; and
the first and second cantilevers are respectively coupled to the plug restriction member and the lid restriction member.

8. The lock device according to claim 7, wherein the first cantilever is separated by a predetermined angular interval about the rotation axis of the rotating body from the second cantilever so that, when the rotating body is rotated in one direction by a predetermined angle, the first cantilever and the second cantilever move the plug restriction member and the lid restriction member in directions that are intersected to each other.

9. The lock device according to claim 8, wherein
the plug restriction member has a longitudinal axis,
the lid restriction member has a longitudinal axis, and
the first and second cantilevers are respectively coupled to the plug restriction member and the lid restriction member such that when the rotating body is rotated by a predetermined angle in one direction, the plug restriction member linearly moves along the longitudinal axis of the plug restriction member from a retracted position, which serves as the plug unlock position, to a projected position, which serves as the plug lock position, and, at the same time, the lid restriction member linearly moves along the longitudinal axis of the lid restriction member from a projected position, which serves as the lid lock position, to a retracted position, which serves as the lid unlock position.

10. A lock device mounted on a vehicle including a battery, a travel motor powered by the battery, a power reception connector for a power supplying plug that charges the battery, and a lid for closing the power reception connector, the lock device comprising:
a pivotal hook stopper that pushes the hook when the power supplying plug is connected to the power reception connector;
a rotating body rotated in a first direction and a second direction by a drive source;
first and second cantilevers extending parallel to a rotation axis of the rotating body in opposite directions;
a hook stopper control member connected to a distal end of the first cantilever, wherein the hook stopper control member moves between a retracted position and a projected position when the rotating body rotates to mechanically switch the hook stopper between a pivotal state and a fixed state that prohibits pivoting; and
a lid latch connected to a distal end of the second cantilever, wherein the lid latch moves between a retracted position and a projected position when the rotating body rotates;
wherein the first cantilever is separated by a predetermined angular interval about the rotation axis of the rotating body from the second cantilever so that, when the rotating body is rotated in one direction by a predetermined angle, the first cantilever and the second cantilever move the hook stopper control member and the lid latch in directions that are intersected to each other, and the lid latch is urged to automatically return to the projection position when the lid is closed while the driving source is deactivated.

11. The lock device according to claim 10, wherein the hook stopper control member has a longitudinal axis, the lid latch has a longitudinal axis, and the first and second cantilevers are respectively coupled to the hook stopper control member and the lid latch such that when the rotating body is rotated by a predetermined angle in one direction, the hook stopper control member linearly moves along the longitudinal axis of the hook stopper control member from the retracted position to the projected position and, at the same time, the lid latch linearly moves along the longitudinal axis of the lid latch from the projected position to the retracted position.

12. The lock device according to claim 10, wherein the first and second cantilevers are arranged at positions separated from the rotation axis of the rotating body by different distances in a radial direction of the rotation body.

* * * * *